Oct. 28, 1969   H. FUNCK   3,475,089
MOTION PICTURE CAMERA EMPLOYING COAXIAL REELS
Filed June 12, 1967   3 Sheets-Sheet 1

INVENTOR.
HERBERT FUNCK
BY Michael S. Striker
Attorney

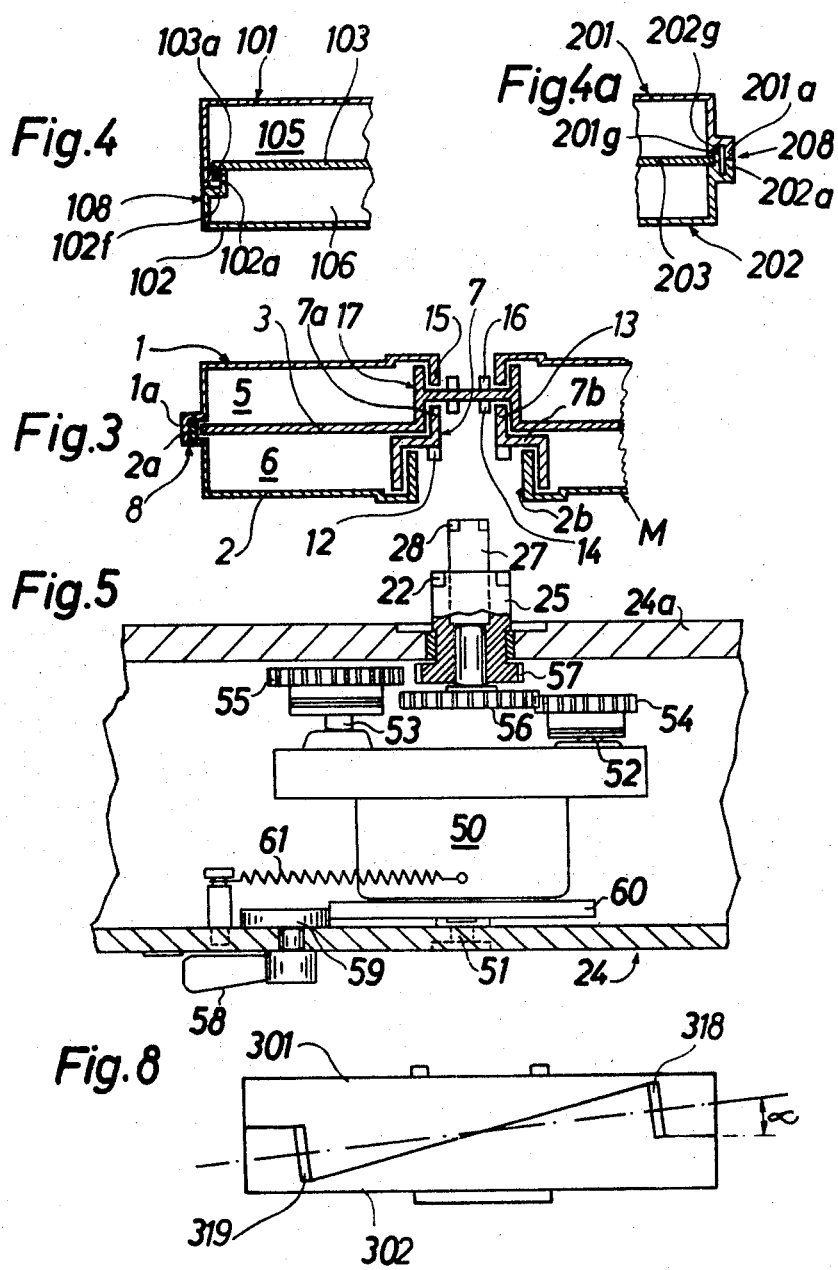

Oct. 28, 1969  H. FUNCK  3,475,089
MOTION PICTURE CAMERA EMPLOYING COAXIAL REELS
Filed June 12, 1967  3 Sheets-Sheet 3
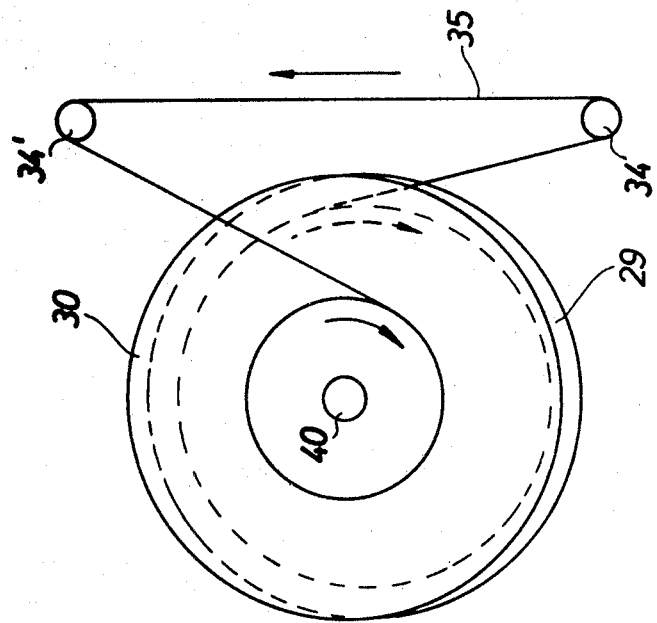
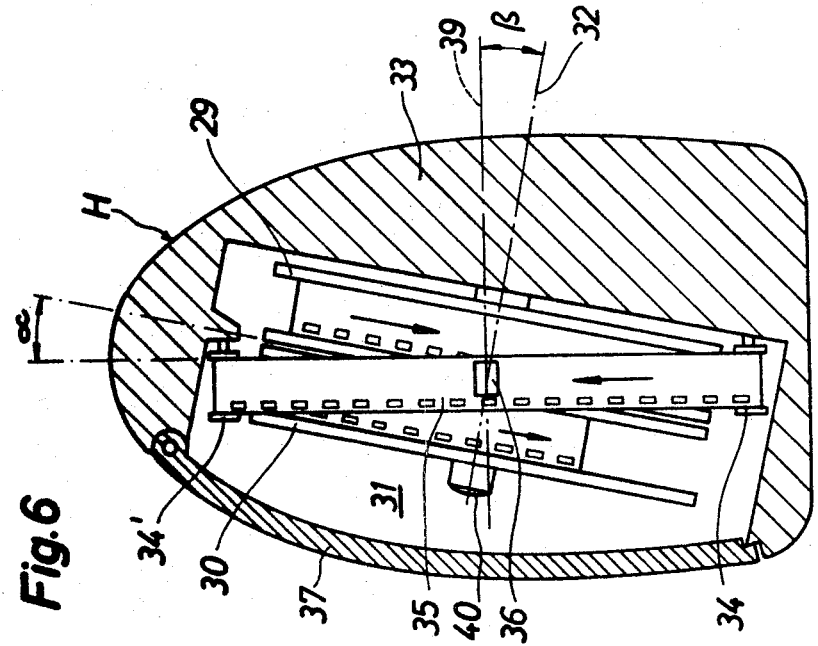
INVENTOR.
HERBERT FUNCK
BY Michael S. Striker,
Attorney

United States Patent Office 3,475,089
Patented Oct. 28, 1969

3,475,089
MOTION PICTURE CAMERA EMPLOYING COAXIAL REELS
Herbert Funck, Grafelfing-Lochham, Germany, assignor to Agfa-Gevaert Aktiengesellschaft, Leverkusen, Germany
Filed June 12, 1967, Ser. No. 645,281
Claims priority, application Germany, June 10, 1966, F 49,443
Int. Cl. G03b 1/00, 23/02
U.S. Cl. 352—156                     11 Claims

ABSTRACT OF THE DISCLOSURE

Motion picture film is stored on one of two stacked coaxial cores and is taken up by the other core. The cores have clutch teeth which are engaged by coaxial drive-shafts provided in the housing of the movie camera. One of the shafts surrounds the other shaft and one of the cores has an opening through which the shafts extend into engagement with the respective clutch teeth. The cores may be mounted in the casing of an openable magazine or can form part of two discrete reels.

The means for guiding the film between the cores and past a window in the camera housing may be installed in the housing or in the magazine.

BACKGROUND OF THE INVENTION

The present invention relates to movie cameras in general, and more particularly to improvements in 8 mm. movie cameras. Still more particularly, the invention relates to improvements in cameras which utilize coaxial film supplying and collecting means.

Movie cameras of the type known as Super-8 cameras utilize a simplified 8 mm. film wherein the size of individual film frames is greater than the size of frames in conventional Double-8 movie film. An important advantage of camares using Super-8 film is that the film must be fed only once in contrast to Double-8 which must be reversed upon completed exposure of one-half thereof. Such reversal consumes time and can result in unintentional exposure. Furthermore, exposed Double-8 film must be cut and spliced to form a single strip. Still further, cameras using coaxial film supplying and collecting means occupy much less room than cameras using Double-8 film.

In presently known movie cameras which utilize Super-8 film, the film is usually stored in block-shaped magazines or cassettes having two chambers one of which supplies unexposed film and the other of which collects exposed film. The film is guided along one edge face of the magazine and passes through a pair of channels in the magazine wall so that a portion of the film extends along the outer side of the wall. This portion registers with the film window of the camera and is exposed when the shutter opens. The leading end of the film is attached to the core in the collecting chamber of the magazine. When the latter is properly inserted into the compartment of the camera housing, the core in the collecting chamber engages a driving member which is rotated in order to withdraw unexposed film from the supplying chamber.

A serious drawback of presently known cameras for Super-8 film is that they utilize very complicated magazines. Furthermore, conventional magazines for such film are expendable, i.e., they can be used only once because their casing must be destroyed in order to gain access to exposed film when the magazine with exposed film is removed from the camera.

SUMMARY OF THE INVENTION

It is an important object of the present invention to provide a novel and improved movie camera which can utilize Super-8 film and which can accommodate simple, inexpensive and reusable film storing and collecting means.

Another object of the invention is provide to novel magazine or cassette for use in a camera of the just outlined character.

A further object of the invention is to provide a movie camera with a novel drive for the film supplying and collecting means.

An additional object of the invention is to provide a novel system of reels and film guide means for use in a magazine or directly in the housing of a movie camera.

A concomitant object of the invention is to provide a novel movie camera for use with film supplying and collecting means of the type wherein the core which supplies unexposed film is coaxial with and adjacent to the core which collects exposed film.

Another object of the invention is to provide a movie camera which occupies less room but can accommodate the same quantity of film as a conventional movie camera for Super-8 film.

Briefly stated, one feature of my invention resides in the provision of a movie camera which comprises a housing having a film compartment and a film window, a pair of coaxial rotary drive means extending into the compartment, a pair of stacked coaxial film convoluting cores removably accommodated in the compartment, one of such cores having an opening for entry of the drive means, cooperating torque-transmitting clutch means provided on each core and on each drive means, the clutch means of each drive means engaging with the clutch means of a core when the cores are properly inserted into the compartment and the clutch means of the other core being accessible through the opening of the one core, prime mover means provided in the housing for rotating the drive means independently of each other, and guide means for guiding the film at a slant between the cores and for guiding the film past the window.

The cores may form part of two separate reels or they may be accommodated in the openable casing of a magazine. In the latter instance, the magazine preferably comprises a partition which divides its interior into a pair of chambers each of which accommodates one of the cores. The partition may be rigid with a core, preferably with the other core, and then forms the single flange of a reel for unexposed or exposed film.

In accordance with another feature of my invention, the common axis of the two drive means makes with a symmetry plane of the film window an angle which corresponds to or approximates the angle of inclination between a plane which is normal to such axis and that length of film which is guided between the cores and passes along the film window.

The novel features which are considered as characteristic of the invention are set forth in particular in the appended claims. The improved movie camera itself, however, both as to its construction and the mode of manipulating the same, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary transverse vertical section as seen in the direction of arrows from the line III—III of FIG. 2;

FIG. 4 is a fragmentary transverse sectional view of a modified magazine;

FIG. 4a is a similar fragmentary transverse sectional view of a third magazine;

FIG. 5 is a fragmentary sectional view of a camera which can utilize magazines of the type shown in FIGS. 1 to 3;

FIG. 6 is a sectional view of a second camera adapted to utilize film supplying and collecting means which may but need not include a magazine;

FIG. 7 is a plan view of the film supplying and collecting means in the camera of FIG. 6; and FIG. 8 is a front elevational view of a magazine which can be used in the camera of FIG. 6.

DESCRIPTION OF THE PREFERRED EMBODIMENTS

Figure 1:
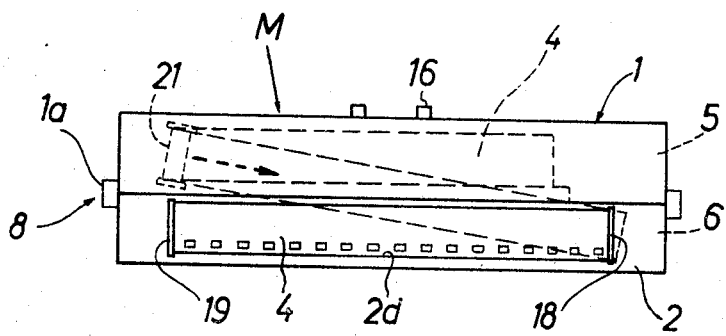
FIG. 1 is a schematic side elevation view of a magazine for Super-8 film which is constructed and assembled in accordance with a first embodiment of my invention.
Figure 2:
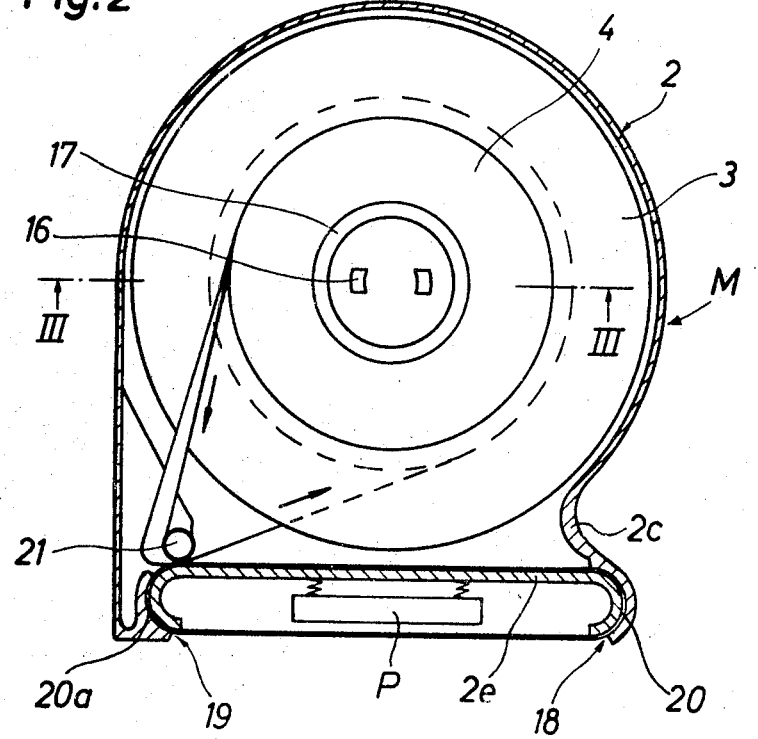
FIG. 2 is a top plan view of the magazine with the upper shell of its casing removed.

Referring first to FIGS. 1 to 3, there is shown a film cassette or magazine M which comprises a casing composed of two portions or shells 1 and 2. A substantially centrally located partition 3 divides the interior of the magazine M into chambers 5 and 6 which respectively serve to accommodate a supply of convoluted unexposed film 4 and a supply of convoluted exposed film. The joint between the open sides of the shells 1 and 2 is shown at 8. This joint comprises an annular external flange 2a provided at the open side of the shell 2 and an annular external flange 1a provided at the open side of the shell 11. The flange 2a is sealingly but removably fitted into the flange 1a to prevent entry of light into the chambers 5 and 6. These flanges can be held together solely by friction. The user can gain access to the film 4 in the magazine M by moving the shells 1, 2 axially and away from each other to withdraw the flange 2a from the flange 1a.

The central portion of the chamber 5 for unexposed film 4 accommodates a cylindrical core 17 for the innermost convolution of the film 4. This core 17 is rigid or integral with the partition 3 and the latter constitutes one flange of a reel for unexposed film 4. The reel comprises the core 17 and a single flange which latter is constituted by the partition 3.

The central portion of the second chamber 6 accommodates a hollow second core 7 for exposed film. A smaller-diameter portion 7a of the core 7 extends through a central opening 13 of the partition 3 and into the interior of the core 17. The core 7 is rotatable between an inwardly extending hub portion 2b of the shell 2 and the partition 3 and includes a disk-shaped central portion 7b provided with clutch elements in the form of teeth or pins 12 which extend axially and away from the core 17. The latter is provided with similar clutch elements in the form of teeth or pins 14 which extend into the opening defined by the smaller-diameter portion 7a of the core 7 and project in the same direction as the teeth 12. In addition, the core 17 comprises a second set of clutch elements or teeth 16 which are disposed opposite the teeth 14 and are accessible at the other side of the magazine M.

The teeth 12 will be driven to rotate the core 7 when the magazine M is inserted into a movie camera and when the user wishes to advance successive frames of the film 4 past a film window. The core 7 then rotates the core 17 and partition 3 through the intermediary of the film 4. When the operator wishes to rewind exposed film onto the core 17, the latter is driven through the intermediary of its teeth 14. The teeth 16 are accessible through a centrally located opening 15 of the shell 1. These teeth will be engaged by a complementary portion of a manually operated crank arm or wheel serving to rewind film onto the core 17 independently of the drive means which can engage the teeth 14. The cores 7, 17 and/or the shells 1, 2 may be provided with suitable labyrinth seals or the like to prevent penetration of light into the chambers 5, 6 through the central openings of the shells. Such seals may be installed between the parts 2–7, 1–17 and 3–7 or 7–17. The partition 3 shares all rotary movements of the core 17 and can be inserted together with a supply or unexposed film 4. It will be seen that the peripheral portion of the partition 3 extends with requisite clearance into the annular flange 2a of the shell 2, i.e., the partition is not clamped between the shells 1 and 2.

The teeth 14, 16 on the core 17 for unexposed film enable the operator to effect rewinding of film 4 onto the core 17 from both sides of the magazine M, either by means of a motor (teeth 14) or by means of a manually operated device (teeth 16).

Referring again to FIGS. 1 and 2, it will be seen that a portion 2c of the shell 2 is flattened along one lateral side and that such portion 2c extends substantially tangentially of the partition 3. The portion 2c has an elongated cutout 2d which is located in front of a supporting wall member 2e provided in the interior of the shell 2 and defining with the portion 2c two arcuate film channels 18, 19. The direction in which the film 4 travels from the chamber 5 toward the chamber 6 and in the chamber 6 is indicated in FIG. 2 by arrows. The length of the portion 2c approximates the diameter of the magazine M and the remainder of the magazine is round. The rounded part extends along an arc of about 270 degrees. The longitudinal ends 20, 20a of the portion 2c form two concaves and cooperate with the adjoining ends of the wall member 2e to define the aforementioned channels 18 and 19. The unexposed film 4 leaves the magazine M through the channel 18 and reenters the magazine through the channel 19 to advance toward and to be convoluted on the core 7 in the chamber 6. A pressure plate P is mounted on springs carried by the wall member 2e and serves to press the film 4 against a suitable window in the camera housing so that the frame which registers with the exposure aperture is absolutely flat during exposure. If desired, the pressure plate P can be mounted in the camera.

The shell 2 accommodates a spool-shaped guide roll 21 which is adjacent to the periphery of the partition 3 and serves to deflect the film 4 against the inner side of the wall member 2e. A second guide roll may be installed in the shell 2 behind the channel 18 or this channel may be formed with an inclined inlet to guide the film into an exposure plane between the channels 18, 19 in which the edges of the film are parallel with the bottom wall of the shell 2. The left-hand end of the wall member 2e deflects the film 4 into a plane which is substantially tangential to the core 7 while the film travels through the channel 19.

As a rule, the film 4 is convoluted on the core 17 in such a way that its emulsion-coated side faces inwardly. Therefore, the guide roll 21 preferably resembles a spool so that it engages the marginal portions but not the central part of the emulsion-coated side. During travel through the channels 18 and 19, the ends of the wall member 2e engage the uncoated side of the film and the channels are wide enough to prevent damage to the emulsion-coated side by permitting the film to remain out of contact with the ends 20, 20a of the portion 2c.

FIG. 4 illustrates another mode of forming a light-tight joint 108 between the open sides of two shells. The shell 101 is without a flange but the shell 102 has an inwardly extending annular flange 102a which enters with clearance the edge portion of the shell 101. This edge portions bears against a shoulder 102f of the flange 102a. The partition 103 has a bead 103a which extends into the space between the flange 102a and shell 101. Suitable sealing elements may be provided between the bead 103a and the shell 101 and/or 102 to prevent entry of light. The partition 103 should be free to rotate with reference to the shells 101, 102. Here, again, the operator can gain access to the chamber 105 by moving the shell 101 axially and away from the shell 102 or vice versa. The other chamber 106 is accessible upon removal of the partition 103.

FIG. 4a shows a further joint 208 which comprises two external flanges 201a, 202a provided at the open sides of the shells 201, 202 and abutting against each other to prevent entry of light. A ring 202g of the shell 202 receives with friction a male annular portion 201g of the shell 201 to hold the latter against axial movement away from the shell 202.

Referring now to FIG. 5, there is shown a portion of a camera which may utilize magazines of the type shown in FIGS. 1 to 4a. This camera will be described in connection with a magazine M of the type shown in FIGS. 1 to 3. It comprises a housing 24 having a wall 24a provided with an opening for a hollow drive shaft in the form of a stub shaft 25 provided with clutch elements 22 complementary to the teeth 12 on the core 7 of FIG. 3. A second drive shaft or stub shaft 27 is coaxially received in the shaft 22 and is rotatable with reference thereto. This second shaft 27 has clutch elements or teeth 28 which are complementary to the teeth 14 on the core 17 of FIG. 3. When the magazine M is attached to the housing 24 so that the shell 2 lies against the wall 24a, the shaft 27 extends through the opening or the core 7 and into the core 17 so that its teeth 28 engage with the teeth 14. At the same time, the shaft 25 extends into the openings of the shell 2 and core 7 and its teeth 22 engage the teeth 12. By effecting rotation of the shaft 25, the operator will cause the core 7 to draw film 4 from the chamber 5 whereby the film travels about the guide roll 21, along the rear or inner side of the wall member 2e, through the channel 18, in front of the pressure plate P, through the channel 19, and is taken up by the core 7 in the chamber 6.

In order to rewind the film onto the core 17, the operator will cause rotation of the shaft 27 so that the latter drives the core 17 and partition 3. The film then advances from the chamber 6, through the channels 19, 18, behind the wall member 2e, about the guide roll 21, and into the chamber 5.

The prime mover 50 which can rotate the shafts 25, 27 comprises a motor or transmission installed in the housing 24 and pivotable about an eccentric pin 51. This prime mover has two output shafts 52, 53 which respectively carry gears 54, 55. The gear 54 meshes with a gear 56 on the shaft 27 when the gear 55 is out of mesh with a gear 57 on the shaft 25. The prime mover 50 can be moved about the pin 51 by means of an actuating member 58 which is turnable in the housing 24 and carries an eccentric cam 59 cooperating with a disk-shaped follower 60 on the casing of the prime mover 50. A spring 61 biases the follower 60 against the cam 59. By changing the angular position of the actuating member 58, the user of the camera can pivot the prime mover 50 about the pin 51 so as to move the gear 55 into engagement with the gear 57 to drive the shaft 25 and core 17. At the same time, the gear 54 moves away from the gear 56 and the shaft 27 comes to a halt. It will be seen that the prime mover 50 can rotate only one of the shafts 25, 27 at a time. As stated before, the shaft 25 will be driven when the user wishes to make exposures and the shaft 27 will be driven when the user wishes to rewind exposed film onto the core 17.

FIG. 6 illustrates a camera which can accommodate modified film supplying and collecting means including two coaxial reels 29, 30 whose cores are similar or analogous to the cores 7, 17 of FIG. 3. The reels 29, 30 form a stack and are accommodate in a compartment 31 of the camera housing H. The drawing shows a drive shaft 40 which corresponds to the shaft 27 of FIG. 5 and serves to rotate the core of the reel 30. The axis of the shaft 40 is shown at 32, and this axis coincides with the axis of the second shaft (not shown) which corresponds to the shaft 25 of FIG. 3 and serves to drive the reel 29. Each of the reels 29, 30 can be driven independently of the other, for example, in a manner as illustrated in FIG. 5.

The guide means for directing the film from the core of the reel 29 onto the core of the reel 30, or vice versa, may be attached to the reels or is permanently installed in the compartment 31. In the embodiment of FIG. 6, the guide means is permanently installed in the housing H and includes a pair of guide rolls 34, 34'. The axis of the guide roll 34 makes with the general plane of the reel 29 an angle alpha and this roll serves to deflect the film from the plane of the reel 29 toward the plane of the reel 30 or vice versa. The axis of the guide roll 34' makes with the general plane of the reel 30 the same angle alpha and serves to deflect the film from the plane of the reel 30 toward the plane of the reel 29 or vice versa. From the roll 34', the film travels tangentially with reference to the core of the reel 30 which is a collecting or takeup reel. A straight portion 35 of the film extends between the guide rolls 34, 34', and this portion 35 makes with the axis 32 an angle beta which is identical with or closely approximates the angle alpha. The window 36 of the camera is positioned in such a way that it registers with successive frames on the film portion 35. Two edges of the window 36 are parallel to the marginal portions of the film portion 35. The inclination of the film portion 35 with reference to the axis 32 corresponds to the angle beta. The inclination of the axis 32 with reference to a symmetry plane 39 of the window 36 also equals beta.

FIG. 7 illustrates in plan view the manner in which the film is caused to travel between the reels 29 and 30 in the compartment 31. This compartment is sealable by a cover or lid 37 which is hinged to the main body portion 33 of the housing H. It will be seen that, by the simple expedient of installing the shaft 40 (and the shaft for the core of the reel 29) in such a way that the axis 32 is inclined with reference to the symmetry plane 39 of the window 36, the film can be guided between two stacked coaxial reels or core in a very simple and space-saving manner. The reels 29, 30 are separable from each other so that only one thereof must be sent to the developing plant. This reduces the cost for shipment and storage. The magazine M of FIGS. 1 to 3 occupies about twice the space which is taken up by a reel 29 or 30.

However, it is equally clear that the camera of FIG. 6 can be used with magazines which are similar to the magazine M or to the magazines shown in FIG. 4 or 4a. All that is necessary is to provide the magazine or the housing H with guide rolls 34, 34' in such a way that the straight portion 35 of the film will travel past the window 36 and that this window will register with successive frames of the film. Furthermore, the magazine M could be modified by dimensioning its casing in such a way that each of the chambers 5, 6 would accommodate a reel 29 or 30. The cores 17 and 7 are then provided on the respective reels. An advantage of such modification is that the user can insert or remove the reels so that he can more readily load and remove film from the magazine.

If the magazine M of FIGS. 1 to 3 is modified for use in the camera of FIG. 6, each of the shells 301, 302 (FIG. 8) will carry one of the guide rolls 34, 34'. The joint 8 is then replaced by a joint which is inclined with reference to the planes of the bottom walls of the shells 301, 302 and the channels 318, 319 are located in different planes. During travel between the channels, the film makes an angle alpha with the planes of the reels. Each channel is preferably open in the plane in which the shells 301, 302 abut to facilitate threading and removal of film.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a motion picture camera, a combination comprising a housing defining a compartment and having a film window; a pair of coaxial rotary drive means extending into said compartment; a pair of stacked coaxial film-convoluting cores removably accommodated in said compartmnet and one there of having an opening for entry of said drive means; cooperating torque-transmitting clutch means provided on each of said cores and on each of said drive means and the clutch means of each drive means engaging with the clutch means of a core, the clutch means of the other of said cores being accessible through the opening of said one core; prime mover means provided in said housing for rotating said drive means; and guide means for guiding the film between said cores and past said window.

2. A combination as defined in claim 1, wherein each of said drive means comprises a stub shaft and wherein one of said stub shafts is hollow and surrounds the other stub shaft.

3. A combination as defined in claim 2, wherein said other stub shaft extends beyond said one shaft and its clutch means are engageable with the clutch means of said other core.

4. A combination as defined in claim 2, wherein said shafts are rotatable independently of each other and wherein said prime mover means comprises means for rotating one of said shafts at a time.

5. A combination as defined in claim 1, wherein said cores form part of a magazine and wherein said magazine further comprises a partition dividing its interior into a pair of chambers each of which accommodates one of said cores.

6. A combination as defined in claim 5, wherein said magazine further comprises a casing accommodating said cores and said partition.

7. A combination as defined in claim 6, wherein said casing has an opening for entry of said drive means into engagement with said cores.

8. A combination as defined in claim 5, wherein said partition is rigid with one of said cores and forms therewith a single-flange reel.

9. A combination as defined in claim 1, wherein the common axis of said drive means makes with a symmetry plane of said window an angle corresponding to the angle of inclination between a plane which is normal to said axis and the film which is guided between said cores.

10. A combination as defined in claim 9, wherein said guide means is provided in said housing.

11. A combination as defined in claim 9, wherein said cores form part of a magazine which is removably received in said compartment and said guide means is provided in said magazine.

References Cited

UNITED STATES PATENTS

| 1,287,503 | 12/1918 | Stechbart | 352—156 |
|---|---|---|---|
| 1,369,127 | 2/1921 | Ray | 352—156 |
| 1,428,480 | 9/1922 | Giroux. | |
| 1,525,990 | 2/1925 | Howell. | |

FOREIGN PATENTS

| 28,754 | 12/1911 | Great Britain. |
|---|---|---|
| 1,017,780 | 1/1966 | Great Britain. |

JULIA E. COINER, Primary Examiner

U.S. Cl. X.R.

352—78